US011647158B2

(12) United States Patent
Bathiche et al.

(10) Patent No.: US 11,647,158 B2
(45) Date of Patent: May 9, 2023

(54) EYE GAZE ADJUSTMENT

(71) Applicant: Microsoft Technology Licensing, LLC, Redmond, WA (US)

(72) Inventors: Steven N. Bathiche, Bellevue, WA (US); Eric Sommerlade, Oxford (GB); Alexandros Neofytou, London (GB); Panos C. Panay, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/084,937

(22) Filed: Oct. 30, 2020

(65) Prior Publication Data

US 2022/0141422 A1    May 5, 2022

(51) Int. Cl.
*H04N 7/15* (2006.01)
*G06N 3/08* (2023.01)
(Continued)

(52) U.S. Cl.
CPC ............... *H04N 7/157* (2013.01); *G06N 3/08* (2013.01); *G06T 7/246* (2017.01); *G06T 11/00* (2013.01);
(Continued)

(58) Field of Classification Search
CPC .......... H04N 7/157; G06N 3/08; G06T 7/246; G06T 11/00; G06T 2207/20081;
(Continued)

(56) References Cited

U.S. PATENT DOCUMENTS 8,957,943 B2   2/2015  Nourbakhsh
9,111,171 B2   8/2015  Son et al.
(Continued)

FOREIGN PATENT DOCUMENTS

WO      2016112346 A1    7/2016

OTHER PUBLICATIONS

Ganin, et al., "DeepWarp: Photorealistic Image Resynthesis for Gaze Manipulation", In Repository of arXiv:1607.07215v2, Jul. 26, 2016, 18 Pages.
(Continued)

*Primary Examiner* — Sing-Wai Wu
(74) *Attorney, Agent, or Firm* — International IP Law Group, PLLC

(57) ABSTRACT

A computing system, a method, and a computer-readable storage medium for adjusting eye gaze are described. The method includes capturing a video stream including images of a user, detecting the user's face region within the images, and detecting the user's facial feature regions within the images based on the detected face region. The method includes determining whether the user is completely disengaged from the computing system and, if the user is not completely disengaged, detecting the user's eye region within the images based on the detected facial feature regions. The method also includes computing the user's desired eye gaze direction based on the detected eye region, generating gaze-adjusted images based on the desired eye gaze direction, wherein the gaze-adjusted images include a saccadic eye movement, a micro-saccadic eye movement, and/or a vergence eye movement, and replacing the images within the video stream with the gaze-adjusted images.

19 Claims, 9 Drawing Sheets

(51) Int. Cl.
*G06T 7/246* (2017.01)
*G06T 11/00* (2006.01)
*G06V 10/22* (2022.01)
*G06V 40/16* (2022.01)

(52) U.S. Cl.
CPC .......... *G06V 10/235* (2022.01); *G06V 40/171* (2022.01); *G06V 40/174* (2022.01); *G06T 2207/20081* (2013.01); *G06T 2207/20084* (2013.01); *G06T 2207/30201* (2013.01)

(58) Field of Classification Search
CPC .......... G06T 2207/20084; G06T 2207/30201; G06V 10/235; G06V 40/171; G06V 40/174
See application file for complete search history.

(56) References Cited

U.S. PATENT DOCUMENTS

| | | |
|---|---|---|
| 9,288,388 B2 | 3/2016 | Son et al. |
| 9,300,916 B1 | 3/2016 | Breedvelt-Schouten et al. |
| 9,740,938 B2 | 8/2017 | Nilsson et al. |
| 2003/0197779 A1 | 10/2003 | Zhang et al. |
| 2008/0278516 A1 | 11/2008 | Santon |
| 2012/0206554 A1 | 8/2012 | Garcia et al. |
| 2013/0070046 A1* | 3/2013 | Wolf ............... G06V 40/197 382/190 |
| 2015/0085056 A1 | 3/2015 | Van |
| 2016/0234463 A1 | 8/2016 | Breedvelt-schouten et al. |
| 2016/0323541 A1 | 11/2016 | Nilsson et al. |
| 2016/0378183 A1 | 12/2016 | Teshome et al. |
| 2019/0110023 A1 | 4/2019 | Sakai et al. |
| 2019/0230310 A1 | 7/2019 | Faulkner |
| 2019/0266701 A1* | 8/2019 | Isikdogan ............... G06V 10/82 |
| 2021/0201021 A1* | 7/2021 | Novelli ............... G06T 7/73 |
| 2021/0360199 A1 | 11/2021 | Oz et al. |
| 2022/0400228 A1 | 12/2022 | Sommerlade et al. |

OTHER PUBLICATIONS

Isikdogan, et al., "Eye Contact Correction using Deep Neural Networks", In Proceedings of the IEEE Winter Conference on Applications of Computer Vision, Mar. 1, 2020, pp. 3307-3315.

"International Search Repod and Written Opinion Issued in PCT Application No. PCT/US21/048306", dated Dec. 13, 2021, 13 Pages.

Vertegaal, et al., "GAZE-2: Conveying Eye Contact in Group Video Conferencing Using Eye-Controlled Camera Direction", In Proceedings of the SIGCHI Conference on Human Factors in Computing Systems, Apr. 5, 2003, pp. 521-528.

Wood, et al., "GazeDirector: Fully Articulated Eye Gaze Redirection in Video", In Eurographics, vol. 37, Issue 2, Apr. 16, 2018, 9 Pages.

Wood, et al., "GazeDirector: Fully Articulated Eye Gaze Redirection in Video", In Repository of arXiv:1704.08763v1, Apr. 27, 2017, 10 Pages.

Yang, et al., "Eye Gaze Correction with Stereovision for Video-Teleconferencing", In Proceeding of European Conference on Computer Vision, May 28, 2002, pp. 479-494.

"Non Final Office Action Issued in U.S. Appl. No. 17/342,849", dated Apr. 1, 2022, 14 Pages.

"Notice of Allowance Issued in U.S. Appl. No. 17/342,849", dated Nov. 7, 2022, 5 Pages.

"International Search Report and Written Opinion Issued in PCT Patent Application No. PCT/US22/028412", dated Sep. 1, 2022, 12 Pages.

"Notice of Allowance Issued in U.S. Appl. No. 17/342,849", dated Mar. 3, 2023, 5 Pages.

* cited by examiner

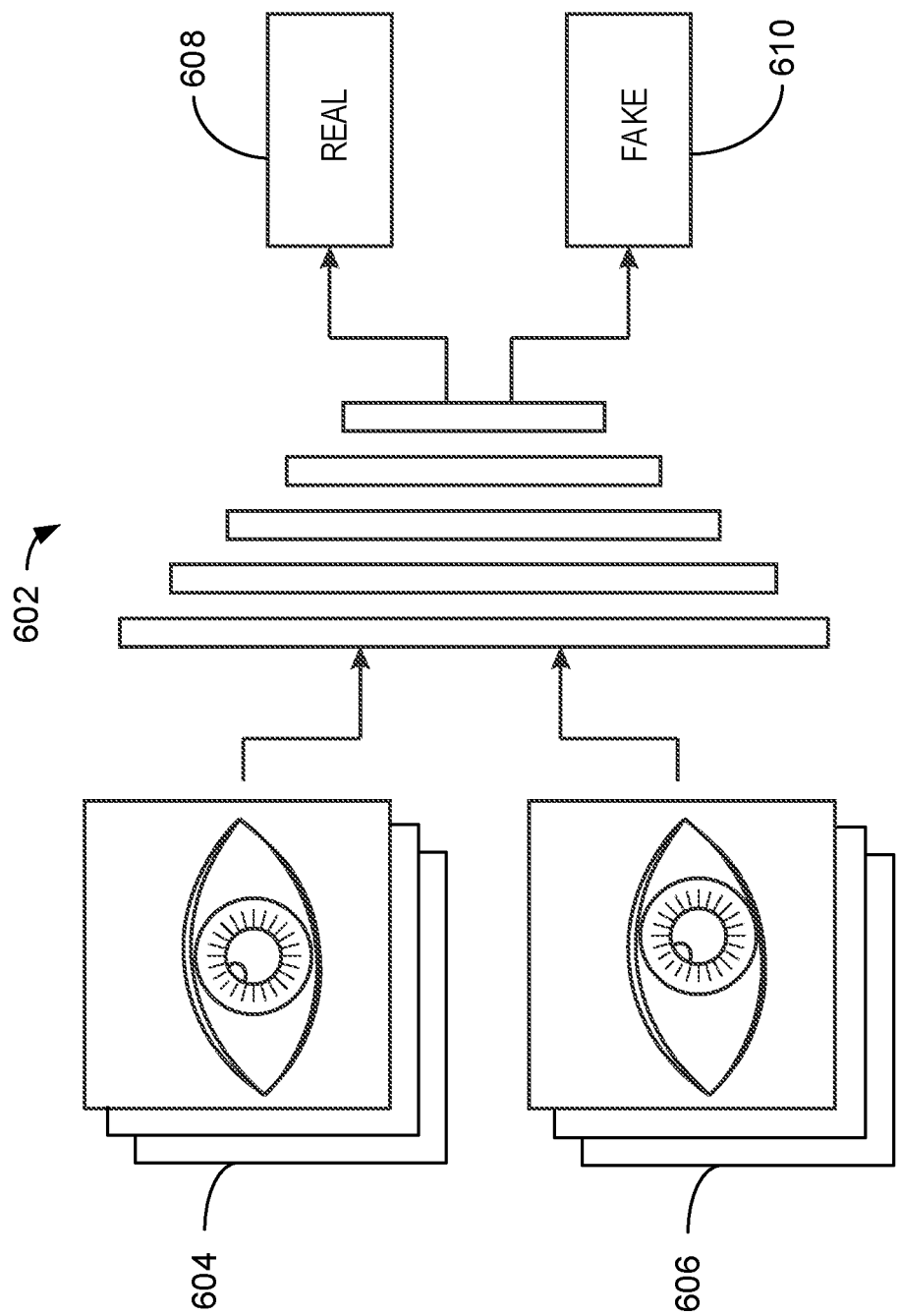

700

702

704

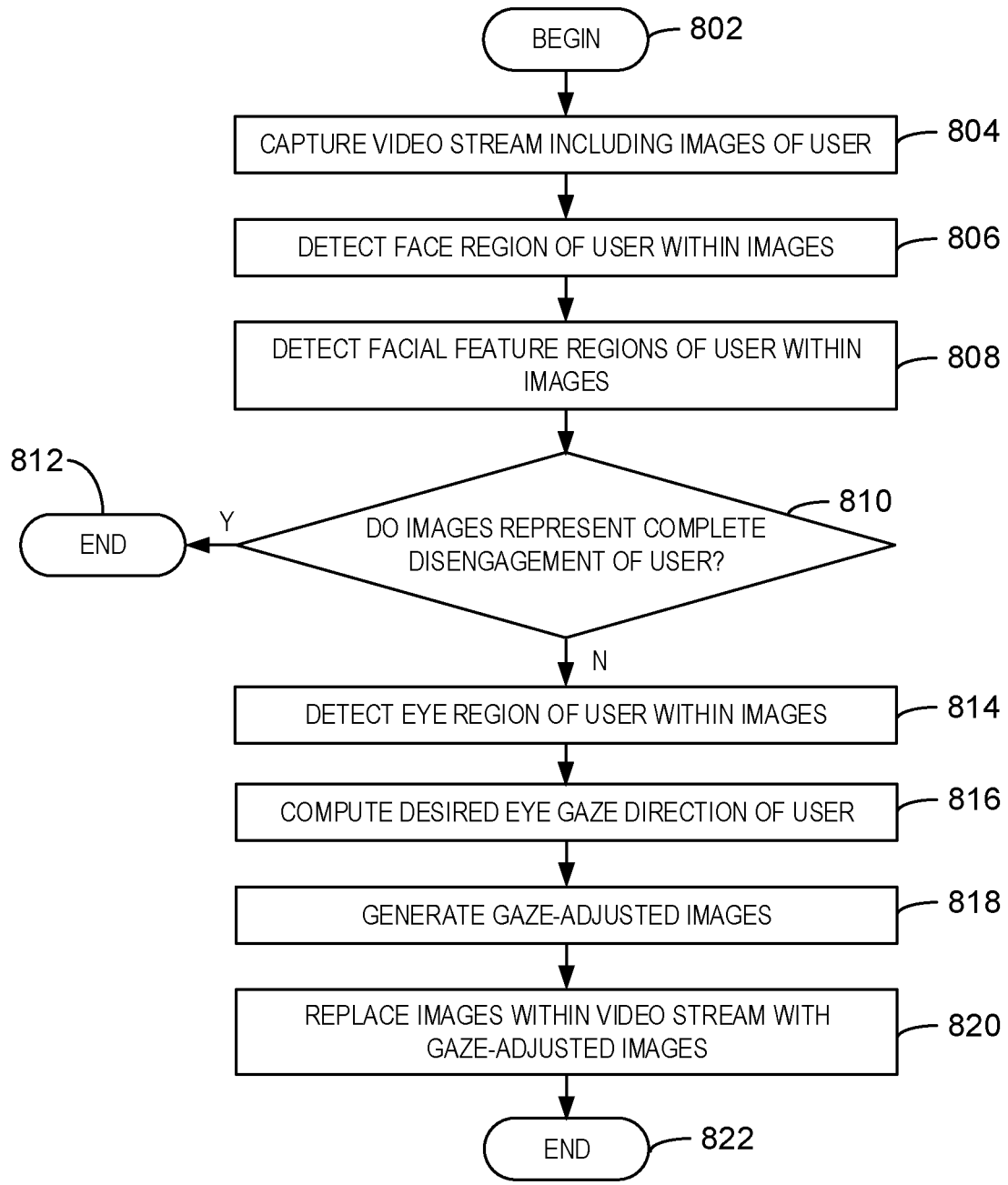

EYE GAZE ADJUSTMENT

BACKGROUND

Video communications are quickly becoming a primary means of human communication in the business and academic worlds, with video meetings and recorded presentations often serving as a replacement for in-person meetings. It is common for the presenter in such video meetings to read from a pre-written script or other text on the display device of their personal computing system, while also using the camera on their computing system to record the video. However, given the geometry of the setup, including the distance of the presenter from the display device and the magnification of the presenter's image on the receiver's display device, it is typically easy for the receiver to perceive that the presenter's eyes are moving and shifting while reading. In addition, if the presenter's camera is located directly above the display device, the receiver may perceive the presenter's eye gaze as being focused on a point below the receiver's eye level. This can be distracting for the receiver, making the overall communication process less effective.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment, a computing system is described. The computing system includes a camera for capturing a video stream including images of a user of the computing system. The computing system also includes a processor for executing computer-executable instructions that cause the processor to receive the images of the user from the camera, to detect a face region of the user within the images, and to detect facial feature regions of the user within the images based on the detected face region. The computer-executable instructions also cause the processor to determine whether the images represent a complete disengagement of the user from the computing system based on the detected facial features regions and, if the images do not represent the complete disengagement of the user from the computing system, to detect an eye region of the user within the images based on the detected facial feature regions. The computer-executable instructions also cause the processor to compute a desired eye gaze direction of the user based on the detected eye region, to generate gaze-adjusted images based on the desired eye gaze direction of the user, wherein the gaze-adjusted images include at least one of a saccadic eye movement, a micro-saccadic eye movement, or a vergence eye movement, and to replace the images within the video stream with the gaze-adjusted images.

In another embodiment, a method for adjusting an eye gaze of a user within a video stream is described. The method includes capturing, via a camera of a computing system, a video stream including images of a user of the computing system. The method also includes detecting, via a processor of the computing system, a face region of the user within the images, and detecting facial feature regions of the user within the images based on the detected face region. The method also includes determining whether the images represent a complete disengagement of the user from the computing system based on the detected facial features regions and, if the images do not represent the complete disengagement of the user from the computing system, detecting an eye region of the user within the images based on the detected facial feature regions. The method also includes computing a desired eye gaze direction of the user based on the detected eye region, generating gaze-adjusted images based on the desired eye gaze direction of the user, wherein the gaze-adjusted images include at least one of a saccadic eye movement, a micro-saccadic eye movement, or a vergence eye movement, and replacing the images within the video stream with the gaze-adjusted images.

In another embodiment, a computer-readable storage medium is described. The computer-readable storage medium includes computer-executable instructions that, when executed by a processor of a computing system, cause the processor to receive a video stream including images of a user, to detect a face region of the user within the images, and to detect facial feature regions within the images based on the detected face region. The computer-executable instructions also cause the processor to determine whether the images represent a complete disengagement of the user from the computing system based on the detected facial features regions and, if the images do not represent the complete disengagement of the user from the computing system, to detect an eye region of the user within the images based on the detected facial feature regions. The computer-executable instructions also cause the processor to compute a desired eye gaze direction of the user based on the detected eye region, to generate gaze-adjusted images based on the desired eye gaze direction of the user, wherein the gaze-adjusted images includes at least one of a saccadic eye movement, a micro-saccadic eye movement, or a vergence eye movement, and to replace the images within the video stream with the gaze-adjusted images.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

FIG. 6 is a schematic view depicting an exemplary process for training the image generator described with respect to FIG. 5;

FIG. 8 is a process flow diagram of a method for adjusting a user's eye gaze within a video stream.

DETAILED DESCRIPTION

Figure 1:
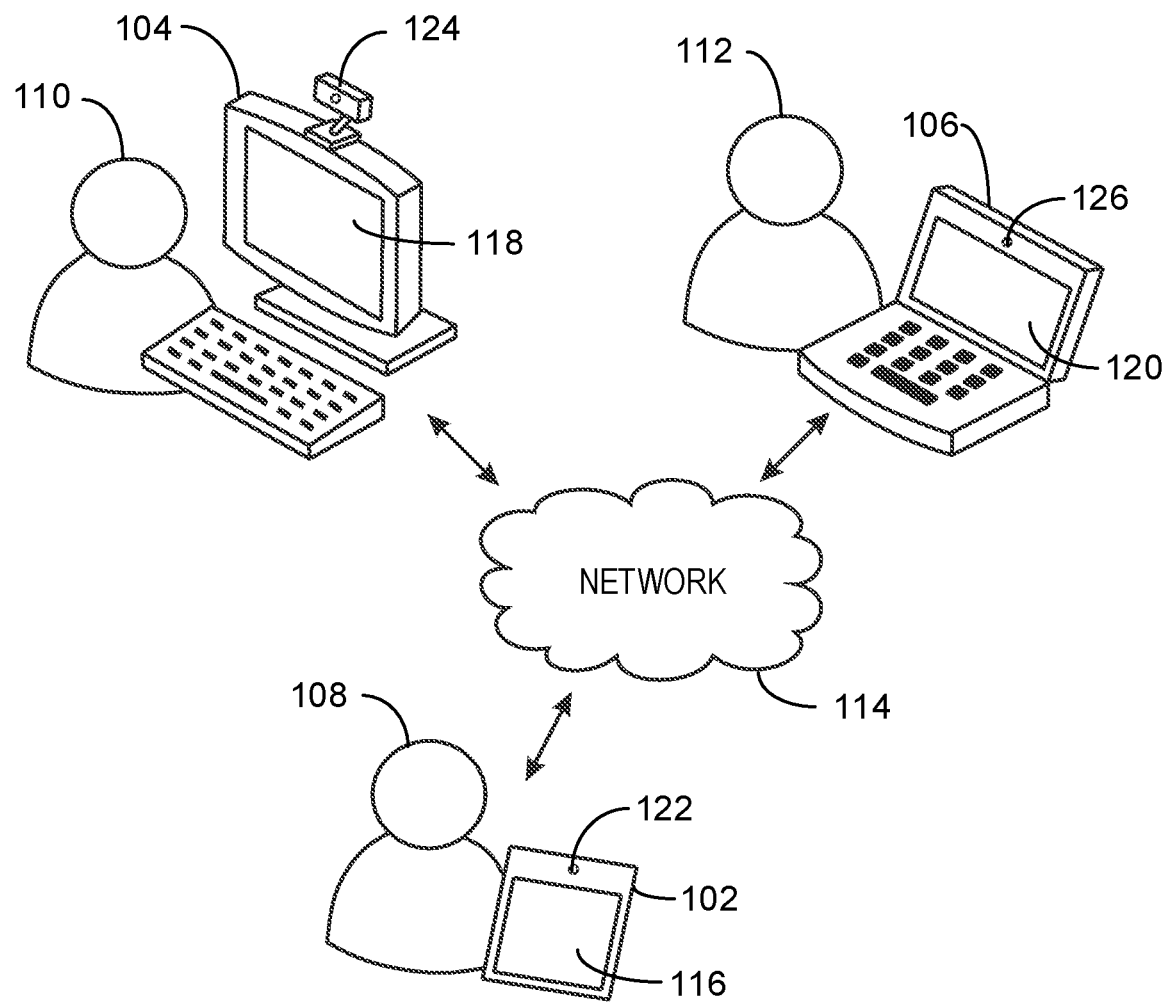
FIG. 1 is a block diagram of an exemplary network environment that is suitable for implementing the eye gaze adjustment techniques described herein.

The signal of attention plays an important role in human communication. Moreover, one of the most important signals for attention is eye gaze. Specifically, various psychological studies have demonstrated that humans are more likely to effectively engage with one another during interpersonal communications when they are able to make eye contact. However, in various video communication scenarios, such as video calls, video conferences, video narrative streams, and recorded speeches/presentations based on pre-written scripts (such as teleprompter scripts or scripts displayed on a display device), this primary signal is lost. In general, when a video communication includes a presenter reading from a display device, the receiver can perceive the shifting (or "back-and-forth") eye movements of the presenter. In addition, if the presenter's camera is located directly above the display device, the receiver may perceive the presenter's eye gaze as being focused on a point below the receiver's eye level. Further, in some cases, the presenter's eye gaze may appear to be overly locked on one part of the display device, which can give the presenter's eyes an unnatural look. These conditions can be distracting for the receiver, thus reducing the likelihood that the presenter will effectively deliver the intended message.

The present techniques provide real-time video modification to adjust a presenter's eye gaze during video communications. More specifically, the present techniques adjust the eye gaze of the presenter in real-time such that sub-optimal eye movements, such as eye movements associated with reading, for example, are removed, while still allowing natural eye movements, such as natural eye movements that are not associated with reading. Moreover, as opposed to previous techniques for modifying eye gaze, the techniques described herein go further than simply fixing the direction of the presenter's eye gaze by providing natural and authentic eye movements that retain the livelihood and identity of the presenter. As a result, such techniques increase the quality of human communication that can be achieved via digital live and/or recorded video sessions.

In various embodiments, the eye gaze adjustment techniques described herein involve capturing a video stream of a user's (or presenter's) face and making adjustments to the images within the video stream such that the direction of the user's eye gaze is adjusted. In some embodiment, this includes recognizing that the user's eyes are moving in a sub-optimal way, such as in a back-and-forth manner that is typically associated with readings lines of text, and then making changes to the eye gaze (and corresponding eye movements) provided in the images such that the eye gaze (and corresponding eye movements) make the user appear to be looking in one direction, such as directly at the camera, without substantial eye movements. In such embodiments, this also includes recognizing when the user's eyes are not moving in the back-and-forth manner that is typically associated with readings lines of text, for example, and/or when the user's eyes are completely disengaged from the computing system, and determining that no eye gaze adjustment is to be performed under such circumstances.

In various embodiments, the eye gaze adjustments described herein are provided, at least in part, by modifying the images within the video stream to synthesize specific types of eye movements. Specifically, there are at least four types of eye movements that are relevant to the present techniques. The first type of eye movement is referred to as a "saccade", which is a rapid, simultaneous movement of both eyes between two focal (or fixation) points. Saccadic eye movements are relatively large movements of greater than 0.25°, which are generally movements that scan an entire scene or multiple features of a scene. In other words, in the case of saccadic eye movements, the eyes are typically jumping from one focal point to another, where each focal point may be separated by several angular degrees. The second type of eye movement is referred to as a "micro-saccade", which is a rapid, simultaneous movement of both eyes between two focal points that are close together. Micro-saccadic eye movements are tiny movements of 0.25° or less (or 1° or less in cases of amplification over low-resolution digital environments), which are generally movements that scan a specific object within a scene. In other words, in the case of micro-saccadic eye movements, the eyes are typically jumping from one region to another nearby region, which may form part of the same overall focal point. The third type of eye movement is referred to as a "vergence", which is a simultaneous movement of both eyes in opposite directions to obtain or maintain single binocular vision on a specific focal point. Vergence eye movements include both convergence eye movements and divergence eye movements, which are generally correlated to the eyes' viewing distance from a specific focal point. The fourth type of eye movement is referred to as "complete disengagement", which is a movement of both eyes completely away from one or more focal points of interest, e.g., in this case, the display device and camera.

In various embodiments, the present techniques adjust the presenter's eye gaze by controlling the presenter's saccadic eye movements, micro-saccadic eye movements, and/or vergence eye movements, while recognizing and allowing complete eye disengagement by the presenter. The overall goal of this process is to produce eye movements that closely emulate the natural eye movements produced by a human's vestibulo-ocular reflex (VOR), which is the reflex that stabilizes eye gaze during head motion. Moreover, by emulating the presenter's natural VOR in this way, the present techniques produce a synthesized eye gaze that appears to be natural, attentive, and dynamic.

The present techniques provide several improvements over previous techniques for modifying eye gaze. As an example, the present techniques provide eye gaze synthesis and redirection using a trained machine learning model that does not rely on the continuous selection of previously-acquired template images or image sequences. In addition to simplifying the overall process, this has the further benefit of avoiding the glazed, uncanny appearance that is often produced via techniques that correct eye gaze using template images. As another example, the present techniques are not restricted to redirecting the presenter's eye gaze towards a camera but, rather, are capable of targeting the eye gaze to any desired physical or virtual focal point. As another example, contrary to previous techniques, the present techniques work automatically without any individual user calibration. As another example, contrary to previous techniques, the present techniques provide a sophisticated, automatic on/off mechanism that prevents adjustment of the presenter's eye gaze during periods when the presenter's eye movements are not consistent with eye movements that are associated with reading, as well as during periods when the presenter's eye movements reveal complete disengagement with the camera and the display device. As another example, the present techniques do not rely on the recognition of specific eye contour points but, rather, only a general eye region. Furthermore, as discussed above, the present techniques provide real-time eye gaze adjustments that retain the livelihood and identity of the presenter, allowing the presenter to interact with the receiver in a more natural way.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage media" refers specifically to non-transitory forms of computer-readable storage media and expressly excludes carrier waves and/or propagated signals.

Network Environment and Computing System for Implementing Eye Gaze Adjustment Techniques Described Herein FIG. 1 is a block diagram of an exemplary network environment 100 that is suitable for implementing the eye gaze adjustment techniques described herein. The exemplary network environment 100 includes computing systems 102, 104, and 106. Each computing system 102, 104, and 106 corresponds to one or more users, such as users 108, 110, and 112, respectively.

In various embodiments, each computing system 102, 104, and 106 is connected to a network 114. The network 114 may be a packet-based network, such as the Internet.

Furthermore, in various embodiments, each computing system 102, 104, and 106 includes a display device 116, 118, and 120, respectively, and a camera 122, 124, and 126, respectively. The camera may be a built-in component of the computing system, such as the camera 122 corresponding to the computing system 102, which is a tablet computer, and the camera 126 corresponding to the computing system 106, which is a laptop computer. Alternatively, the camera may be an external component of the computing system, such as the camera 124 corresponding to the computing system 104, which is a desktop computer. Moreover, it is to be understood that the computing systems 102, 104, and/or 106 can take various other forms, such as, for example, that of a mobile phone (e.g., smartphone), wearable computing system, television (e.g., smart TV), set-top box, and/or gaming console. Furthermore, the specific embodiment of the display device and/or camera may be tailored to each particular type of computing system.

At any given time, one or more users 108, 110, and/or 112 may be communicating with any number of other users 108, 110, and/or 112 via a video stream transmitted across the network 114. Moreover, in various embodiments, this video communication may include a particular user, sometimes referred to herein as the "presenter", presenting information to one or more remote users, sometimes referred to herein as the "receiver(s)". As an example, if the user 108 is acting as the presenter, the presenter may present such information by reading text from the display device 116 of the computing system 102. In such embodiments, the computing system 102 may be configured to implement the eye gaze adjustment techniques described herein. Accordingly, the remote users 110 and/or 112, who are acting as the receivers, may perceive an adjusted eye gaze of the presenter via their display devices 118 and/or 120, respectively. Based on the presenter's adjusted eye gaze, the receivers may perceive that the presenter's eyes have a natural, attentive appearance, rather than the shifting appearance that is typically associated with reading. Details relating to an exemplary implementation of the presenter's computing system (and the associated eye gaze adjustment capabilities) are described further with respect to FIG. 2.

It is to be understood that the block diagram of FIG. 1 is not intended to indicate that the network environment 100 is to include all the components shown in FIG. 1 in every case. For example, the exact number of users and/or computing systems may vary depending on the details of the specific implementation. Moreover, the designation of each user as a presenter or a receiver may continuously change as the video communication progresses, depending on which user is currently acting as the presenter. Therefore, any number of the computing systems 102, 104 and/or 106 may be configured to implement the eye gaze adjustment techniques described herein.

In some embodiments, the eye gaze adjustment techniques are provided by a video streaming service that is configured for each computing system on demand. For example, the eye gaze adjustment techniques described herein may be provided as a software licensing and delivery model, sometimes referred to as Software as a Service (SaaS). In such embodiments, a third-party provider may provide eye gaze adjustment capabilities to consumer computing systems, such as the presenter's computing system, via a software application running on a cloud infrastructure.

Furthermore, in some embodiments, one or computing systems 102, 104, and/or 106 may have multiple users at any given point in time. Accordingly, the eye gaze adjustment techniques described herein may include a dominant face tracking functionality that is configured to determine which user is the dominant speaker and, thus, the current presenter, at any given point in time. Additionally or alternatively, the dominant face tracking functionality may be configured to simultaneously treat any (or all) of the users of a particular computing system as presenters at any given point in time.

Figure 2:
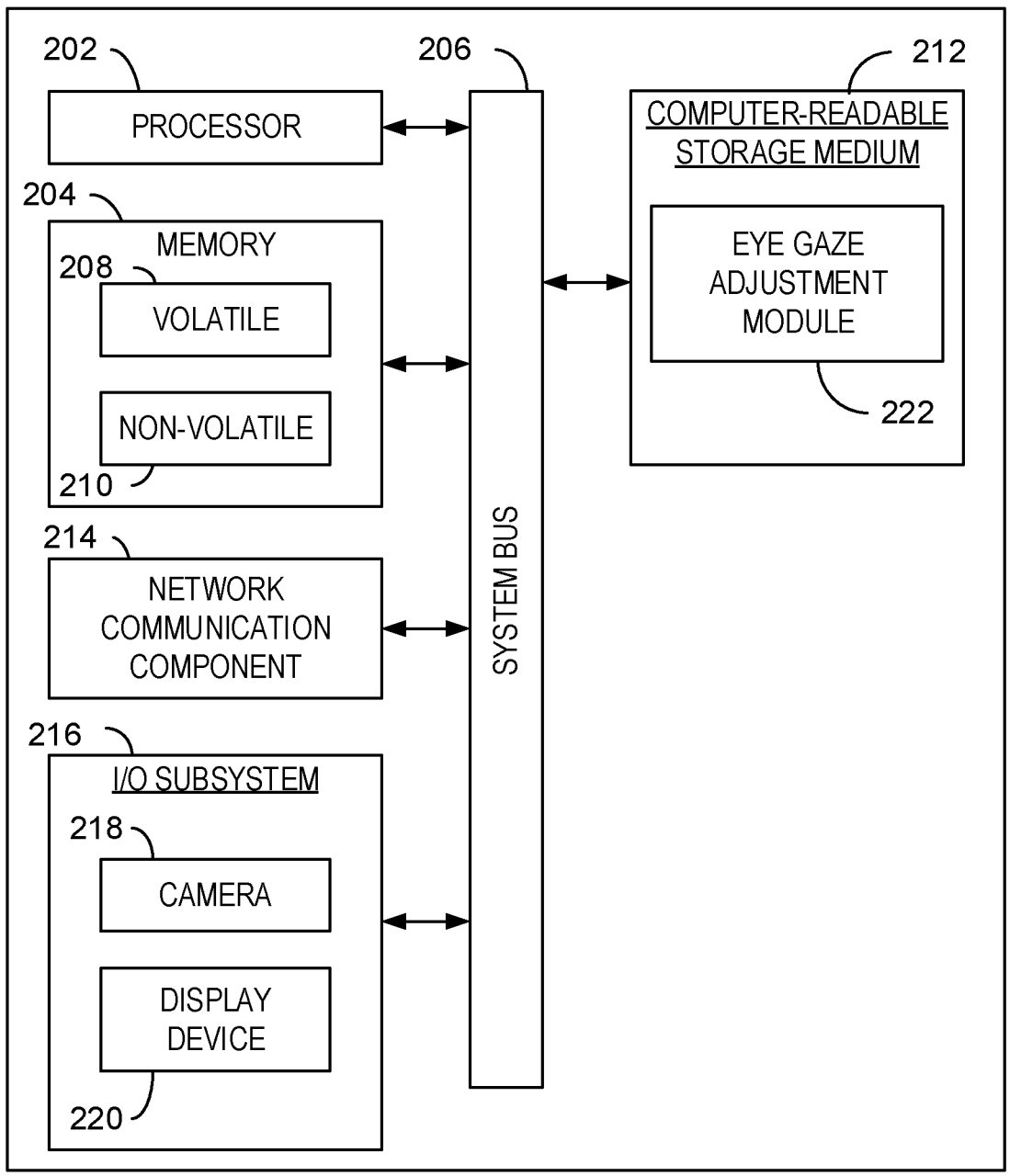
FIG. 2 is a block diagram of an exemplary computing system that is configured to implement the eye gaze adjustment techniques described herein.

FIG. 2 is a block diagram of an exemplary computing system 200 that is configured to implement the eye gaze adjustment techniques described herein. In various embodiments, the exemplary computing system 200 embodies one or more of the computing systems 102, 104, and 106 described with respect to the network environment 100 of FIG. 1. In particular, the exemplary computing system 200 embodies the computing system of a user (i.e., a presenter) engaging in a video communication that involves reading text from a display device.

The exemplary computing system 200 includes one or more processors (or processing units), such as processor 202, and a memory 204. The processor 202 and memory 204, as well as other components, are interconnected by way of a system bus 206. The memory 204 typically (but not always) includes both volatile memory 208 and non-volatile memory 210. The volatile memory 208 retains or stores information so long as the memory is supplied with power. By contrast, the non-volatile memory 210 is capable of storing (or persisting) information even when a power supply is not available. Generally speaking, RAM and CPU cache memory are examples of volatile memory 208, whereas ROM, solid-state memory devices, memory storage devices, and/or memory cards are examples of non-volatile memory 210.

The processor 202 executes instructions retrieved from the memory 204 and/or from computer-readable storage media, such as computer-readable storage medium 212, in carrying out various functionalities, such as the functionalities of the eye gaze adjustment techniques described herein. Moreover, the processor 202 may include any of a number of available processors, such as a single-processor, a multi-processor, single-core units, and/or multi-core units.

The exemplary computing system 200 also includes a network communication component 214 for interconnecting the computing system 200 with other devices and/or services over a computer network, including other computing systems, such as any of the computing systems 102, 104, and/or 106 described with respect to FIG. 1. The network communication component 214, which is sometimes referred to as a network interface card (NIC), communicates over a network (such as the network 114 described with respect to FIG. 1) using one or more communication protocols via a physical/tangible (e.g., wired, optical, etc.) connection, a wireless connection, or both. As will be readily appreciated by those skilled in the art, a network communication component, such as the network communication component 214, typically includes hardware and/or firmware components (and may also include executable software components) that transmit and receive digital and/or analog signals over a transmission medium (i.e., the network).

The computing system 200 also includes an input/output (I/O) subsystem 216. The I/O subsystem 216 includes a set of hardware, software, and/or firmware components that enable or facilitate inter-communication between the user of the computing system 200 and the processor of the computing system 200. Indeed, via the I/O subsystem 216, the user may provide input via one or more input channels, such as, by way of illustration and not limitation, one or more touchscreen/haptic input devices, one or more buttons, one or more pointing devices, one or more audio input devices, and/or one or more video input devices, such as camera 218. In addition, the user may provide output via one or more output channels, such as, by way of illustration and not limitation, one or more audio output devices, one or more haptic feedback devices, and/or one or more display devices, such as display device 220.

In some embodiments, the display device 220 is a built-in display screen of the computing system 200. In other embodiments, the display device 220 is an external display screen. Moreover, in some embodiments, the display device is a touchscreen that serves as both an input and an output device.

The camera 218 may be any suitable type of video recording device that is configured to capture a video stream of the user of the computing system 200. The video stream includes a series of video frames, wherein each video frame includes a sequence of images. In various embodiments, the camera 218 is located in the vicinity of the display device 220. For example, the camera 218 may be located near an edge of the display device 220, such as immediately above or below the display device 220. In addition, in various embodiments, the camera 218 has an image capture component that faces outwardly and is capable of capturing a frontal view of the user's face when the user is viewing the display device 220. The camera 218 may include, for example, a front-facing camera integrated into the computing system 200, or an external camera that is attached to the display device 220 in any suitable manner.

According to embodiments described herein, the computer-readable storage medium 212 includes an eye gaze adjustment module 222. The eye gaze adjustment module 222 includes computer-executable instructions which, when executed by the processor 202, cause the processor 202 to perform a method for adjusting the eye gaze of the user of the computing system 200. In various embodiments, the eye gaze adjustment module 222 receives images extracted from the video stream of the user captured by the camera 218. In some cases, the received images represent a video stream of the user reading from a text displayed on the display device 220, rather than looking directly at the camera 218. In such cases, the eye gaze adjustment module 222 generates sequences of images, e.g., video frames, in which the eye gaze of the user has been adjusted to appear as if the user is looking directly at the camera 218. In various embodiments, this method for adjusting eye gaze is performed in real-time, meaning that there is no significant latency between the recording of the video stream and the delivery of the video stream including the adjusted eye gaze to one or more remote computing systems. In other words, the eye gaze adjustment module 222 is configured to run at substantially the same rate as the frame rate of the camera, without any significant lag time.

In various embodiments, the eye gaze adjustment module 222 itself includes a number of sub-modules (not shown) for performing the method for adjusting eye gaze. Such sub-modules may include, by way of illustration and not limitation, a face localization sub-module for detecting a face region of a user within the images captured by the camera 218, a facial feature localization sub-module for detecting facial feature regions of the user within the images based on the detected face region, a head pose estimation sub-module for estimating the head pose of the user based on the detected facial feature regions, a camera orientation estimation sub-module for estimating the orientation of the camera based on the detected facial feature regions, a complete disengagement determination sub-module for determining whether the images represent the complete disengagement of the user from the computing system, an eye localization sub-module for detecting an eye region of the user within the images based on the detected facial feature regions, an eye region classification sub-module for determining whether eye movements of the user are sub-optimal, a desired eye gaze determination sub-module for computing a desired eye gaze direction of the user based on the detected eye region, and an eye gaze synthetization sub-module for generating gaze-adjusted images based on the desired eye gaze direction of the user. Further details relating to the functionality of the eye gaze adjustment module 222 (and corresponding sub-modules) in performing the method for adjusting eye gaze are described further with respect to FIGS. 4-9.

In various embodiments, the eye gaze adjustment module 222 described herein improves the video functionality provided by the camera 218 of the computing system 200 in several respects. For example, the eye gaze adjustment module 222 allows the user's eye gaze to be redirected to the camera 218 or to any other physical or virtual focal point, regardless of the positioning of the camera 218 with relation to the computing system 200. This provides the computing system 200 manufacturer and/or the user with considerable freedom with regard to the configuration of the camera 218. As another example, because the eye gaze adjustment module 222 performs eye gaze synthesis and redirection using a trained machine learning model that does not rely on the continuous selection of previously-acquired template images, the eye gaze adjustment module 222 may significantly increase the speed of the computing system 200 as compared to previous techniques for modifying eye gaze. For example, in some embodiments, the eye gaze adjustment module 222 generates the gaze-adjusted images at a rate that is substantially the same as the frame rate of the camera 218. As yet another example, the eye gaze adjustment module 222 allows the computing system 200 to provide gaze-adjusted images automatically (i.e., without any individual user calibration), thus significantly improving the user's interaction with the computing system 200.

As described herein, in some embodiments, rather than adjusting the user's eye gaze such that it appears to be looking directly at the camera 218, the eye gaze adjustment module 222 adjusts the user's eye gaze such that it appears to be looking at another focal point of interest, such as a virtual focal point on the user's display device 220. For example, if the video communication includes presenting a video to remote users, then the user's eye gaze may be automatically directed to the portion of the display device 220 on which the video is playing. As another example, if multiple remotely-located users are engaged in video communication, the users' individual display devices may be set up in split-screen mode. In such cases, the user's eye gaze may be automatically directed to the portion of the display device 220 including the particular remote user who is currently being addressed. This may provide important visual cues that further enhance the overall communication process.

In some embodiments, the eye gaze adjustment module 222 is used to perform the method for adjusting eye gaze on pre-recorded video streams (such as, for example, pre-recorded speeches and presentations for events or television programs) that are not immediately distributed to remote computing systems. In such embodiments, the video stream including the adjusted eye gaze may not be delivered to the remote computing system(s) in real-time but, rather, may be stored in memory, either locally (i.e., in the memory 204) or remotely (e.g., in the cloud), for later distribution.

In various embodiments, the eye gaze adjustment module 222 includes an automatic on/off mechanism that enables adjustment of the user's eye gaze during periods when the user's eye gaze (and associated eye movements) are determined to be sub-optimal, and prevents adjustment of the user's eye gaze during other periods of time. For example, the on/off mechanism may prevent adjustment of the user's eye gaze during periods when the user's eye movements are not consistent with eye movements that are associated with reading, as well as during periods when the user's eye movements reveal complete disengagement with the camera 218 and the display device 220. In addition, while the eye gaze adjustment module 222 is configured to function autonomously of the user in most circumstances, in some embodiments, the eye gaze adjustment module 222 includes a user-selectable on/off mechanism whereby the user can prevent the eye gaze adjustment module 222 from performing any eye gaze adjustment during particular portions of a video stream. This may provide the user with the ability to maintain the appearance of reading lines of text in instances in which the user deems such appearance to be appropriate.

The block diagram of FIG. 2 is not intended to indicate that the computing system 200 is to include all of the components shown in FIG. 2. Rather, the computing system 200 can include fewer or additional components not illustrated in FIG. 2, depending on the details of the specific implementation. Furthermore, any of the functionalities of the eye gaze adjustment module 222 may be partially, or entirely, implemented in hardware and/or in the processor 202. For example, any of the functionalities of the eye gaze adjustment module 222 may be implemented using an application specific integrated circuit (ASIC), using logic implemented in the processor 202, and/or using any other suitable component or device.

As described herein, in some embodiments, the functionalities of the eye gaze adjustment module 222 are provided as a software application that is licensed to the user and delivered to the user's computing system 200. As another example, in some embodiments, the functionalities of the eye gaze adjustment module 222 are provided as a cloud-based, online video streaming service.

Furthermore, in some embodiments, the eye gaze adjustment module 222 may be implemented on the remote user's (i.e., the receiver's) computing system. In such embodiments, the remote computing system may receive the video stream from the presenter's computing system over the network, and the eye gaze adjustment module 222 may then adjust the presenter's eye gaze within the video stream prior to the receiver viewing the video stream on the receiver's display device. This may be performed on a live video stream in real-time, or on a pre-recorded video stream at some later date.

Figure 3:
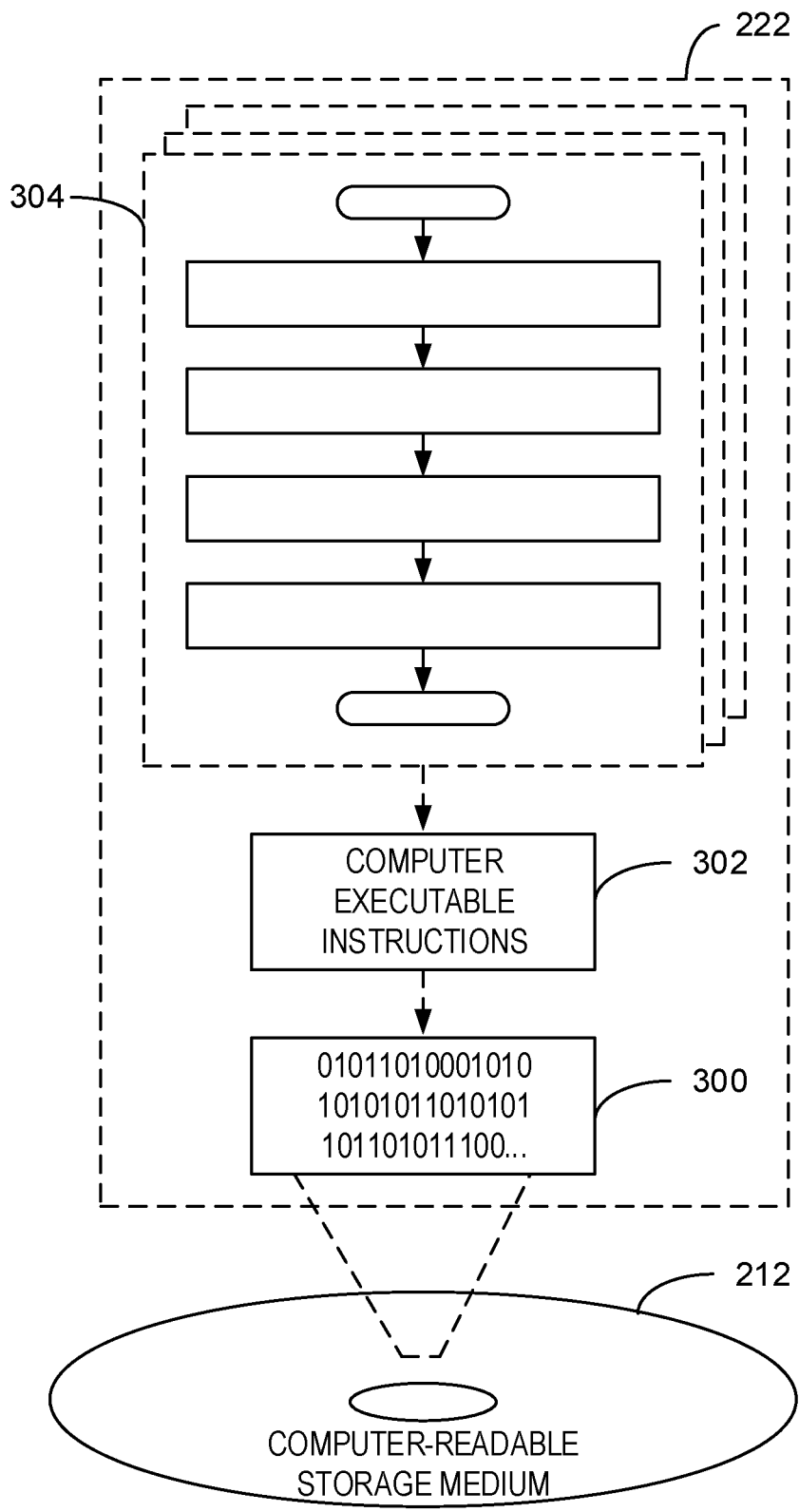
FIG. 3 is a schematic view depicting the manner in which the eye gaze adjustment module of FIG. 2 may be implemented within the computer-readable storage medium of FIG. 2.

FIG. 3 is a schematic view depicting the manner in which the eye gaze adjustment module 222 of FIG. 2 may be implemented within the computer-readable storage medium 212 of FIG. 2. Like numbered items are as described with respect to FIG. 2. As shown in FIG. 3, the eye gaze adjustment module 222 includes computer-readable data 300. The computer-readable data 300 make up a set of computer-executable instructions 302 that, when executed by the processor 202, cause the processor 202 to perform one or more methods 304 for adjusting eye gaze, such as any of the exemplary processes 400, 500, and 600 described with respect FIGS. 4, 5, and 6, respectively, and/or the exemplary method 800 and/or 900 described with respect to FIGS. 8 and 9, respectively.

Processes and Methods for Implementing Eye Gaze Adjustment Techniques Described Herein As a preliminary matter, it should be noted that the exemplary processes 400, 500, and 600 and the exemplary methods 800 and 900 described below are implemented by a computing system, such as the computing system 200 described with respect to FIG. 2, which may form part of a network environment, such as the network environment 100 described with respect to FIG. 1. More specifically, the exemplary processes 400, 500, and 600 and the exemplary methods 800 and 900 may be implemented by the computing system of a user (i.e., a presenter) who is engaged in video communication with one or more remote users (i.e., receivers), wherein the video communication includes images in which the user's eye gaze and associated eye movements are sub-optimal, such as images including eye movements that correspond to the user reading lines of text from a display device.

Figure 4:
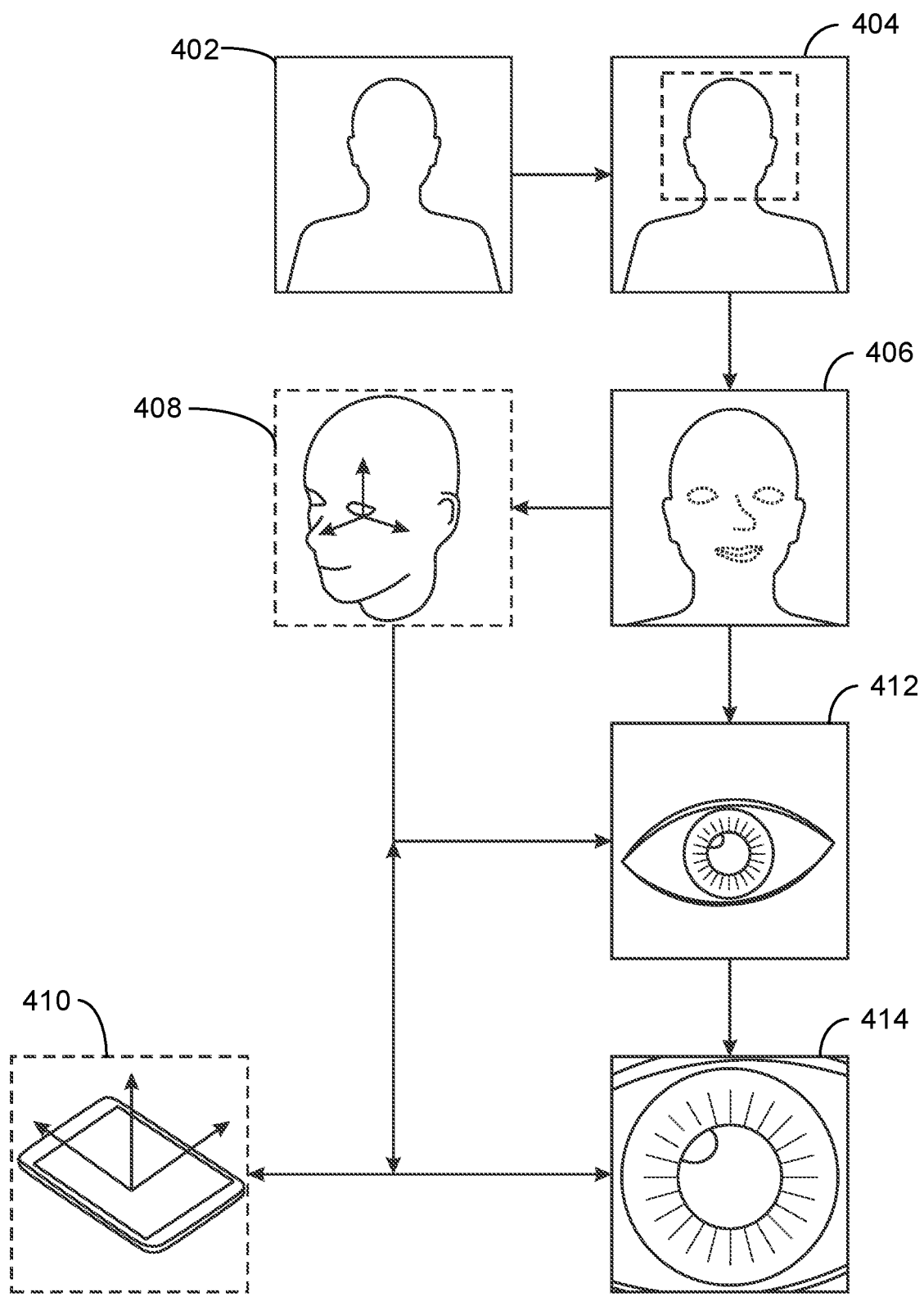
FIG. 4 is a schematic view depicting an exemplary process for computing a user's desired eye gaze direction.

FIG. 4 is a schematic view depicting an exemplary process 400 for computing the user's desired eye gaze direction. In various embodiments, the exemplary process 400 is executed by the processor using a trained neural network. Specifically, the neural network may be trained to prepare and analyze incoming video image data as part of an inference process for computing the user's desired eye gaze direction.

As depicted by block 402, the process 400 begins with the input of image data or, in other words, the receipt of a video stream including images of a user of the computing system. In some embodiments, this includes capturing the video stream using a camera of the computing system, while, in other embodiments, it involves receiving the video stream from a remote computing system over the network.

As depicted by block 404, face localization may be performed to detect a face region of the user within the images. As depicted by block 406, facial feature localization may be performed to detect facial feature regions of the user within the images. As depicted by block 408 and 410, respectively, the neural network may use the detected facial feature regions as input for implicitly determining the head pose of the user and the orientation of the camera (and the computing system in general). This information may then be used to determine whether the images represent a complete disengagement of the user from the computing system. In various embodiments, this involves determining whether a user's head is rotated too far in one direction relative to the camera orientation (e.g., based on the angular coordinates of the user's head pose relative to the camera orientation).

As depicted by block 412, if the images do not represent the complete disengagement of the user from the computing system, eye localization may be performed to detect an eye region of the user within the images based on the detected facial feature regions. Optionally, in some embodiments, the neural network may then analyze the detected eye region to determine whether the eye movements of the user represent sub-optimal eye movements, such as shifting eye movements associated with reading. In such embodiments, if the eye movements of the user do represent sub-optimal eye movements, a desired eye gaze direction of the user is computed based on the detected eye region, as depicted by block 414. In other embodiments, the desired eye gaze direction of the user is automatically computed without determining whether the eye movements of the user represent sub-optimal eye movements. This may be particularly useful for embodiments in which the user has manually moved the on/off mechanism for the eye gaze adjustment module to the "on" position. Moreover, in various embodiments, the desired eye gaze direction may be computed such that the user's eye gaze is directed towards the camera or towards a physical or virtual focal point of interest, such as a virtual focal point located on the user's display device.

Figure 5:
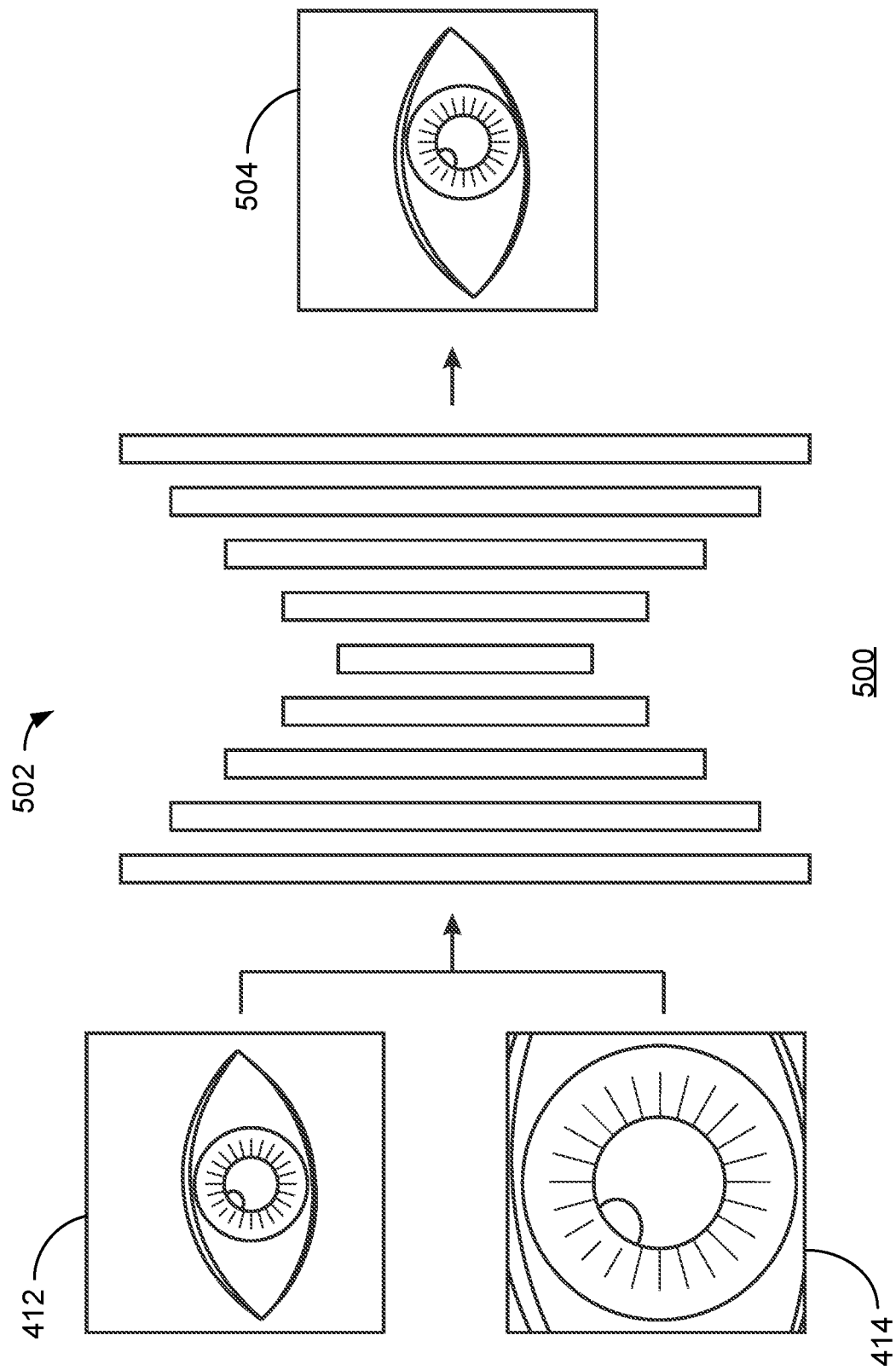
FIG. 5 is a schematic view depicting an exemplary process for generating gaze-adjusted images based on the user's desired eye gaze direction.

FIG. 5 is a schematic view depicting an exemplary process 500 for generating gaze-adjusted images based on the user's desired eye gaze direction. Like numbered items are as described with respect to FIG. 4. In various embodiments, the exemplary process 500 is executed by the processor using a trained neural network. Specifically, the neural network may be a trained image generator 502. In various embodiments, the trained image generator 502 is a generative model within a generative adversarial network (GAN) that is trained in conjunction with a discriminative model, as described further with respect to FIG. 6.

In various embodiments, the trained image generator 502 is configured to combine the image of the user's eye region, as depicted by block 412, with the desired eye gaze direction, as depicted by block 414, to generate the gaze-adjusted images, as depicted by block 504. More specifically, the image generator 502 may generate the gaze-adjusted images by: (1) analyzing the images to determine natural saccadic eye movements, natural micro-saccadic eye movements, and/or natural vergence eye movements of the user within the images; (2) comparing the eye gaze of the user within the images with the desired eye gaze direction of the user; and (3) modifying or adjusting the saccadic eye movements, the micro-saccadic eye movements, and/or the vergence eye movements of the user within the images to produce the gaze-adjusted images. In some embodiments, modified saccadic eye movements are used to, for example, accommodate changes in the user's background, while modified micro-saccadic eye movements are used to, for example, add subtle noise to the eye gaze, which may make the synthesized eye gaze appear more natural.

According to embodiments described herein, the user's eye movements may be adjusted, modified, simulated, and/or synthesized in any suitable manner to produce the desired gaze-adjusted images. For example, in some embodiments, specific eye movements are adjusted by pairing the input image with the desired output image to, for example, make the eye movements appear less distinct or extreme. As a specific example, saccadic eye movements and/or micro-saccadic eye movements may be adjusted such that the eyes only move half as far to the left and/or the right. Additionally or alternatively, the specific eye movements may be adjusted by using standard Brownian motion techniques to artificially generate new eye movements that still appear to be natural and dynamic. Additionally or alternatively, the specific eye movements may be rendered entirely by the trained image generator 502 independently of the user's natural eye movements. For example, the trained image generator 502 may synthesize eye movements that make the user's eyes appear to be moving in a natural manner even when the user's eye gaze is overly locked on one part of the display device.

Furthermore, in some embodiments, the image generator 502 is configured to analyze the gaze-adjusted images generated at block 504 to determine whether the original images within the video stream should be replaced with the gaze-adjusted images. For example, the image generator 502 may include an algorithm for assigning a confidence value (i.e., a non-binary metric) to the gaze-adjusted images (and/or to specific pixels or portions within the gaze-adjusted images). If the confidence value is above a specified threshold value, then the original images within the video stream may be replaced with the gaze-adjusted images. However, if the confidence value is below the specified threshold value, then the image generator 502 may determine that the overall eye gaze adjustment process has failed, at which point the entire process may be either aborted or repeated.

FIG. 6 is a schematic view depicting an exemplary process 600 for training the image generator 502 described with respect to FIG. 5. The exemplary process 600 may be executed by a processor using a trained image discriminator 602. In various embodiments, the trained image discriminator 602 is a discriminative model that is used to train the image generator 502 within a generative adversarial network (GAN). As a more specific example, the image discriminator 602 may be a standard convolutional neural network.

In various embodiments, multiple gaze-adjusted images are generated by the image generator 502 during the training phase. These generated gaze-adjusted images are then input to the image discriminator 602, as depicted by block 604, along with corresponding target images, as depicted by block 606. After the comparison process, the image discriminator 602 outputs an authenticity value of real, as shown at block 608, or fake, as shown at block 610, for each gaze-adjusted image. This may be accomplished by, for example, using the image discriminator as a classifier to distinguish between the two sources, i.e., the real images and the fake images.

In various embodiments, if the image discriminator 602 assigns an authenticity value of fake to the gaze-adjusted images, then the image discriminator 602 has identified a flaw in the image generator's operation. As a result, the image generator 502 may analyze the output from the image discriminator 602 and then update itself by, for example, adjusting its parameters, to produce more realistic gaze-adjusted images. Moreover, this training process 600 may continue until a predetermined number (or percentage) of the gaze-adjusted images generated by the image generator 502 are classified as real. Once that occurs, the image generator 502 has converged, and the training process is complete. At this point, the image generator 502 has been trained to produce gaze-adjusted images that are indistinguishable from real images and, thus, the image generator 502 is ready to be used for the eye gaze adjustment techniques described herein.

Figure 7A:
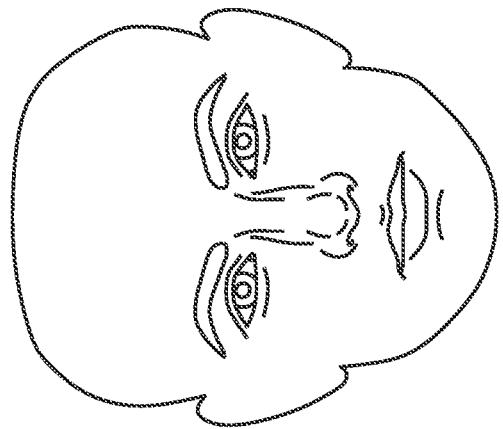
FIG. 7A is a schematic view of a non-gaze-adjusted image that may be captured by a user's camera as the user reads text from a display device.

FIG. 7A is a schematic view of a non-gaze-adjusted image 700 that may be captured by a user's camera as the user reads text from a display device. As shown in FIG. 7A, the non-gaze-adjusted image 700 may be perceived as if the user's eyes are focused on a point below the remote user's eye level. This is particularly true for instances in which the user's camera is positioned directly above the display device from which the user is reading.

Figure 7B:
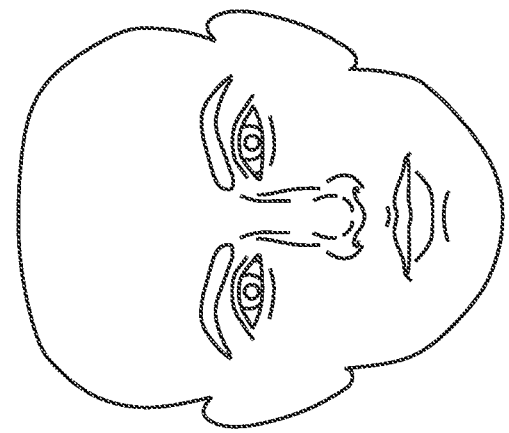
FIG. 7B is a schematic view of another non-gaze-adjusted image that may be captured by the user's camera as the user reads text from the display device.

FIG. 7B is a schematic view of another non-gaze-adjusted image 702 that may be captured by the user's camera as the user reads text from the display device. As shown in FIG. 7B, the non-gaze-adjusted image 702 may be perceived as if the user's eyes are overly locked on one part of the user's display device, which may give the user's eyes an unnatural look.

Figure 7C:
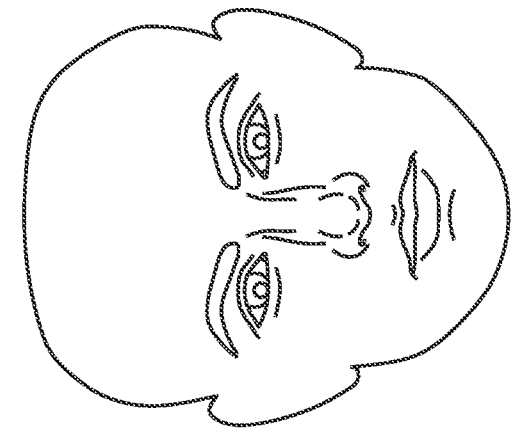
FIG. 7C is a schematic view of a gaze-adjusted image that may be generated according to the eye gaze adjustment techniques described herein.

FIG. 7C is a schematic view of a gaze-adjusted image 704 that may be generated according to the eye gaze adjustment techniques described herein. Specifically, as shown in FIG. 7C, the eye gaze adjustment techniques described herein generate an adjusted eye gaze that appears to be natural and attentive. Moreover, the eye gaze adjustment techniques described herein also produce natural and authentic eye movements that retain the user's livelihood and identity.

FIG. 8 is a process flow diagram of a method 800 for adjusting a user's eye gaze within a video stream. In various embodiments, the method 800 is executed at a rate that is substantially the same as the frame rate of the camera used to capture the video stream. Moreover, in various embodiments, the method 800 is executed using one or more trained neural networks, such as the neural networks described with respect to FIGS. 4-6.

The method 800 begins at block 802. At block 804, a video stream including images of the user is captured by the camera. At block 806, a face region of the user is detected within the images. At block 808, facial feature regions of the user are detected within the images based on the detected face region.

At block 810, a determination is made about whether the images represent a complete disengagement of the user from the computing system based on the detected facial features regions. In some embodiments, this includes estimating a head pose of the user based on the detected facial feature regions, estimating an orientation of the camera based on the detected facial feature regions, and determining whether the images represent the complete disengagement of the user from the computing system based on the detected facial feature regions, the estimated head pose of the user, and the estimated orientation of the camera.

If the images do represent the complete disengagement of the user from the computing system, then the method 800 ends at block 812. If the images do not represent the complete disengagement of the user from the computing system, the method 800 proceeds to block 814, at which an eye region of the user is detected within the images based on the detected facial feature regions.

At block 816, a desired eye gaze direction of the user is computed based on the detected eye region. In some embodiments, this includes using the detected eye region, the estimated head pose of the user, and the estimated orientation of the camera to compute the desired eye gaze direction of the user. Moreover, in various embodiments, this includes computing the desired eye gaze direction of the user such that the eye gaze of the user is directed towards the camera, or computing the desired eye gaze direction of the user such that the eye gaze of the user is directed towards a focal point of interest that is located on the display device of the computing system.

At block 818, gaze-adjusted images are generated based on the desired eye gaze direction of the user. In various embodiments, the gaze-adjusted images include at least one of a saccadic eye movement, a micro-saccadic eye movement, or a vergence eye movement. In various embodiments, the gaze-adjusted images are generated by comparing the originals images and the desired eye gaze direction via a neural network that acts as an image generator, as described with respect to FIG. 5. Moreover, in various embodiments, the gaze-adjusted images are generated by analyzing the images to determine a saccadic eye movement, a micro-saccadic eye movement, and/or a vergence eye movement of the user within the images, comparing the eye gaze of the user within the images with the desired eye gaze direction of the user, and adjusting the saccadic eye movement, the micro-saccadic eye movement, and/or the vergence eye movement of the user within the images to produce the gaze-adjusted images.

In various embodiments, the gaze-adjusted images are generated using an image generator, which may be trained using an image discriminator within a generative adversarial network (GAN). Specifically, in some embodiments, the image generator is trained prior to executing the method 800, wherein training the image generator includes: (1) inputting a number of target images and a number of gaze-adjusted images generated by the image generator into the image discriminator; (2) comparing the target images and the gaze-adjusted images using the image discriminator; (3) assigning an authenticity value of real or fake to each gaze-adjusted image; and (4) updating the image generator in response to assigning the authenticity value of fake to any of the gaze-adjusted images.

At block 820, the images within the video stream are replaced with the gaze-adjusted images, and the method then ends at block 822. In some embodiments, the generated gaze-adjusted images are analyzed to assign a confidence value to the gaze-adjusted images. In such embodiments, the images within the video stream may be replaced with the gaze-adjusted images if the confidence value is above a specified threshold value, while the images within the video stream may not be replaced with the gaze-adjusted images if the confidence value is below the specified threshold value. Furthermore, in various embodiments, the processor may automatically monitor whether a user-selectable on/off mechanism is moved to an "on" position or an "off" position and, if the user-selectable on/off mechanism is moved to the "off" position, prevent the replacement of the images within the video stream with the gaze-adjusted images.

In some embodiments, the video stream includes images of multiple users of the computing system. In such embodiments, the method 800 may be simultaneously executed for each user within the images. Alternatively, the method 800 may be executed for the user who is currently presenting information. For example, this may include detecting the face regions of each user within the images, detecting the facial feature regions of each user within the images based on the detected face regions, and analyzing the detected facial feature regions to determine which user is the current presenter. Once the current presenter has been identified, the remainder of the method may be executed to generate gaze-adjusted images for the current presenter.

Figure 9:
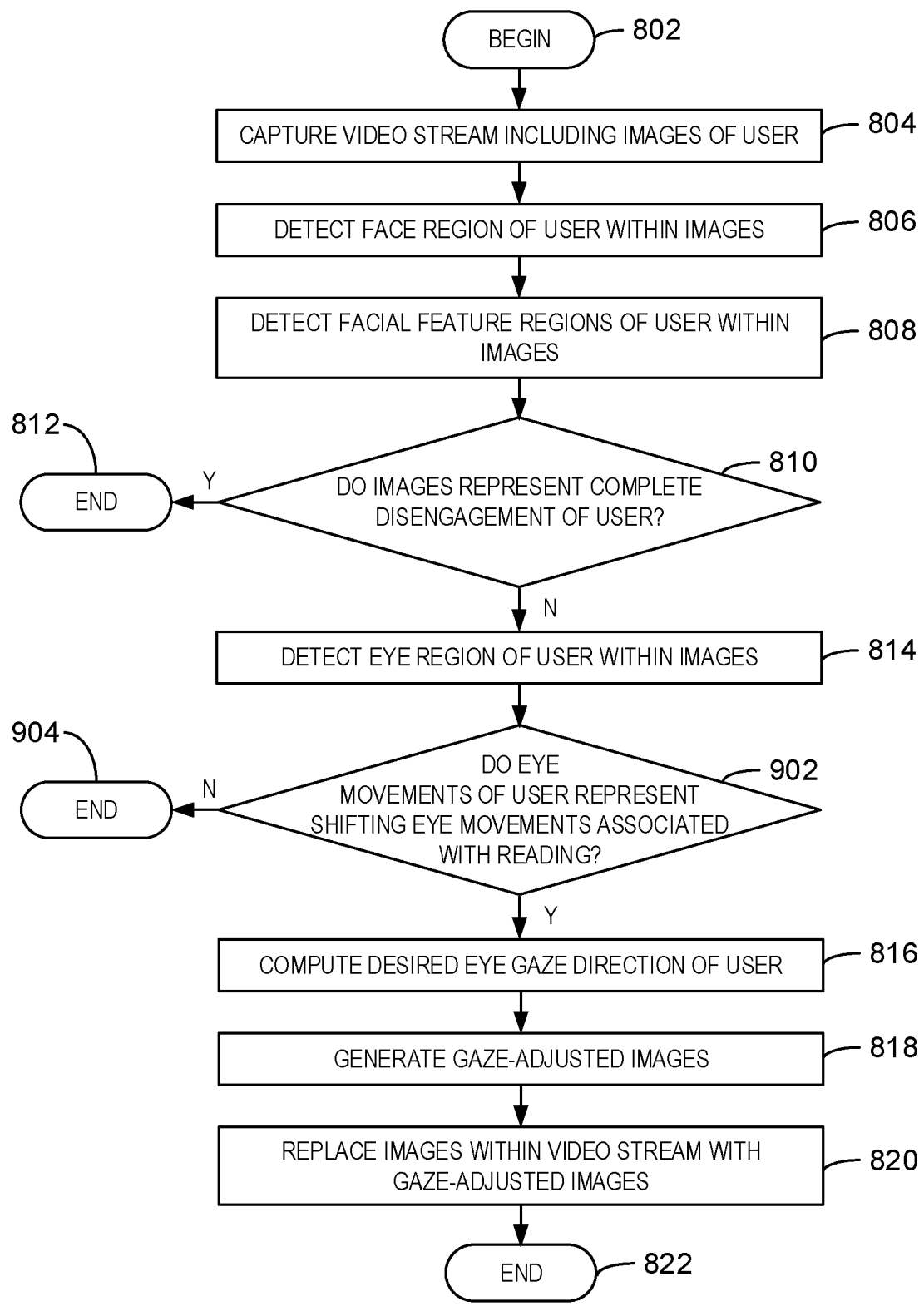
FIG. 9 is a process flow diagram of another method for adjusting a user's eye gaze within a video stream.

FIG. 9 is a process flow diagram of another method 900 for adjusting a user's eye gaze within a video stream. Like numbered items are as described with respect to the method 800 of FIG. 8. The method 900 of FIG. 9 is similar to the method 800 of FIG. 8. However, in the exemplary embodiment shown in FIG. 9, the method 900 includes an additional step for determining whether the eye movements of the user represent shifting eye movements associated with reading, as depicted at block 902. As shown in FIG. 9, this may be performed after the eye region of the user is detected within the images at block 816, but before the eye gaze direction of the user is detected at block 816. Moreover, in such embodiments, if the eye movements of the user do not represent the shifting eye movements associated with reading, the method 900 ends at block 904. Conversely, if the eye movements of the user do represent the shifting eye movements associated with reading, the method proceeds to block 816, at which the desired eye gaze direction of the user is computed based on the detected eye region.

In various embodiments, including this additional step within the method 900 allows the eye gaze adjustment process to be automatically terminated if the eye movements of the user indicate that the user is not reading lines of text. Moreover, it should be noted that block 902 of the method 900 can be altered to make any determination regarding whether the eye gaze (and associated eye movements) of the user are optimal or sub-optimal. For example, in some embodiments, block 902 of the method 900 additionally or alternatively includes determining whether the user's eye gaze is overly locked on one part of the display device. If the user's eye gaze is overly locked on one part of the display device, the method 900 may proceed to block 816. Otherwise, the method 900 may end at block 904.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

Examples of the Present Techniques

Example 1 is a computing system. The computing system includes a camera for capturing a video stream including images of a user of the computing system. The computing system also includes a processor for executing computer-executable instructions that cause the processor to receive the images of the user from the camera, to detect a face region of the user within the images, and to detect facial feature regions of the user within the images based on the detected face region. The computer-executable instructions also cause the processor to determine whether the images represent a complete disengagement of the user from the computing system based on the detected facial features regions and, if the images do not represent the complete disengagement of the user from the computing system, detect an eye region of the user within the images based on the detected facial feature regions. The computer-executable instructions also cause the processor to compute a desired eye gaze direction of the user based on the detected eye region, to generate gaze-adjusted images based on the desired eye gaze direction of the user, wherein the gaze-adjusted images include at least one of a saccadic eye movement, a micro-saccadic eye movement, or a vergence eye movement, and to replace the images within the video stream with the gaze-adjusted images Example 2 includes the computing system of example 1, wherein the computer-executable instructions further cause the processor to generate the gaze-adjusted images using a trained image generator, wherein the image generator is trained using an image discriminator within a generative adversarial network (GAN).

Example 3 includes the computing system of any one of examples 1 to 2, including or excluding optional features. In this example, the computer-executable instructions further cause the processor to determine whether the images represent the complete disengagement of the user from the computing system based on the detected facial features regions by estimating a head pose of the user based on the detected facial feature regions, estimating an orientation of the camera based on the detected facial feature regions, and determining whether the images represent the complete disengagement of the user from the computing system based on the detected facial feature regions, the estimated head pose of the user, and the estimated orientation of the camera.

Example 4 includes the computing system of example 3, including or excluding optional features. In this example, the computer-executable instructions further cause the processor to compute the desired eye gaze direction of the user based on the detected eye region, the estimated head pose of the user, and the estimated orientation of the camera.

Example 5 includes the computing system of any one of examples 1 to 4, including or excluding optional features. In this example, the video stream includes images of multiple users of the computing system, and the computer-executable instructions further cause the processor to generate gaze-adjusted images for a current presenter by detecting the face regions of each of the multiple users within the images, detecting the facial feature regions of each of the multiple users within the images based on the detected face regions, analyzing the detected facial feature regions to determine which one of the multiple users is the current presenter, and generating the gaze-adjusted images for the current presenter.

Example 6 includes the computing system of any one of examples 1 to 5, including or excluding optional features. In this example, the computer-executable instructions further cause the processor to automatically monitor whether a user-selectable on/off mechanism is moved to an "on" position or an "off" position, and prevent the replacement of the images within the video stream with the gaze-adjusted images when the user-selectable on/off mechanism is moved to the "off" position.

Example 7 includes the computing system of any one of examples 1 to 6, including or excluding optional features. In this example, the computer-executable instructions further cause the processor to compute the desired eye gaze direction of the user by computing the desired eye gaze direction of the user such that an eye gaze of the user is directed towards the camera, or computing the desired eye gaze direction of the user such that the eye gaze of the user is directed towards a focal point of interest that is located on a display device of the computing system.

Example 8 includes the computing system of any one of examples 1 to 7, including or excluding optional features. In this example, the computer-executable instructions further cause the processor to generate the gaze-adjusted images based on the desired eye gaze direction of the user by: (1) analyzing the images to determine at least one of a saccadic eye movement, a micro-saccadic eye movement, or a vergence eye movement of the user within the images; (2) comparing an eye gaze of the user within the images with the desired eye gaze direction of the user; or (3) adjusting the at least one of the saccadic eye movement, the micro-saccadic eye movement, and the vergence eye movement of the user within the images to produce the gaze-adjusted images.

Example 9 is a method for adjusting an eye gaze of a user within a video stream is described. The method includes capturing, via a camera of a computing system, a video stream including images of a user of the computing system. The method also includes detecting, via a processor of the computing system, a face region of the user within the images and detecting facial feature regions of the user within the images based on the detected face region. The method also includes determining whether the images represent a complete disengagement of the user from the computing system based on the detected facial features regions and, if the images do not represent the complete disengagement of the user from the computing system, detecting an eye region of the user within the images based on the detected facial feature regions. The method also includes computing a desired eye gaze direction of the user based on the detected eye region, generating gaze-adjusted images based on the desired eye gaze direction of the user, wherein the gaze-adjusted images include at least one of a saccadic eye movement, a micro-saccadic eye movement, or a vergence eye movement, and replacing the images within the video stream with the gaze-adjusted images.

Example 10 includes the method of example 9, including or excluding optional features. In this example, the method includes analyzing the detected eye region to determine whether eye movements of the user represent shifting eye movements associated with reading. The method also includes computing the desired eye gaze direction of the user if the eye movements of the user represent the shifting eye movements associated with reading, or terminating the method if the eye movements of the user do not represent the shifting eye movements associated with reading.

Example 11 includes the method of any one of examples 9 to 10, including or excluding optional features. In this example, determining whether the images represent the complete disengagement of the user from the computing system based on the detected facial features regions includes: (1) estimating a head pose of the user based on the detected facial feature regions; (2) estimating an orientation of the camera based on the detected facial feature regions; and (3) determining whether the images represent the complete disengagement of the user from the computing system based on the detected facial feature regions, the estimated head pose of the user, and the estimated orientation of the camera.

Example 12 includes the method of example 11, including or excluding optional features. In this example, computing the desired eye gaze direction of the user based on the detected eye region includes using the detected eye region, the estimated head pose of the user, and the estimated orientation of the camera to compute the desired eye gaze direction of the user.

Example 13 includes the method of any one of examples 9 to 12, including or excluding optional features. In this example, the method includes generating the gaze-adjusted images using a trained image generator. The method also includes training the image generator prior to executing the method of claim 9, wherein training the image generator includes inputting a number of target images and a number of gaze-adjusted images generated by the image generator into an image discriminator, comparing the target images and the gaze-adjusted images using the image discriminator, assigning an authenticity value of real or fake to each gaze-adjusted image, and updating the image generator in response to assigning the authenticity value of fake to any of the gaze-adjusted images.

Example 14 includes the method of any one of examples 9 to 13, including or excluding optional features. In this example, the video stream includes images of multiple users of the computing system, and the method is executed for a current presenter by: (1) detecting the face regions of each of the multiple users within the images; (2) detecting the facial feature regions of each of the multiple users within the images based on the detected face regions; (3) analyzing the detected facial feature regions to determine which one of the multiple users is the current presenter; and (4) executing a remainder of the method to generate gaze-adjusted images for the current presenter.

Example 15 includes the method of any one of examples 9 to 14, including or excluding optional features. In this example, the method includes analyzing the generated gaze-adjusted images to assign a confidence value to the gaze-adjusted images. The method also includes replacing the images within the video stream with the gaze-adjusted images if the confidence value is above a specified threshold value, or preventing the replacement of the images within the video stream with the gaze-adjusted images if the confidence value is below the specified threshold value.

Example 16 includes the method of any one of examples 9 to 15, including or excluding optional features. In this example, computing the desired eye gaze direction of the user includes computing the desired eye gaze direction of the user such that the eye gaze of the user is directed towards the camera, or computing the desired eye gaze direction of the user such that an eye gaze of the user is directed towards a focal point of interest that is located on a display device of the computing system.

Example 17 includes the method of any one of examples 9 to 16, including or excluding optional features. In this example, generating the gaze-adjusted images based on the desired eye gaze direction of the user includes: (1) analyzing the images to determine at least one of a saccadic eye movement, a micro-saccadic eye movement, or a vergence eye movement of the user within the images; (2) comparing an eye gaze of the user within the images with the desired eye gaze direction of the user; or (3) adjusting the at least one of the saccadic eye movement, the micro-saccadic eye movement, and the vergence eye movement of the user within the images to produce the gaze-adjusted images.

Example 18 is a computer-readable storage medium. The computer-readable storage medium includes computer-executable instructions that, when executed by a processor of a computing system, cause the processor to receive a video stream including images of a user, to detect a face region of the user within the images, and to detect facial feature regions within the images based on the detected face region. The computer-executable instructions also cause the processor to determine whether the images represent a complete disengagement of the user from the computing system based on the detected facial features regions and, if the images do not represent the complete disengagement of the user from the computing system, detect an eye region of the user within the images based on the detected facial feature regions. The computer-executable instructions also cause the processor to compute a desired eye gaze direction of the user based on the detected eye region, to generate gaze-adjusted images based on the desired eye gaze direction of the user, wherein the gaze-adjusted images includes at least one of a saccadic eye movement, a micro-saccadic eye movement, or a vergence eye movement, and to replace the images within the video stream with the gaze-adjusted images Example 19 includes the computer-readable storage medium of example 18, including or excluding optional features. In this example, the computer-executable instructions further cause the processor to generate the gaze-adjusted images using a trained image generator, wherein the image generator is trained using an image discriminator within a GAN.

Example 20 includes the computer-readable storage medium of any one of examples 18 to 19, including or excluding optional features. In this example, the computer-executable instructions further cause the processor to determine whether the images represent the complete disengagement of the user from the computing system based on the detected facial features regions by estimating a head pose of the user based on the detected facial feature regions, estimating an orientation of the camera based on the detected facial feature regions, and determining whether the images represent the complete disengagement of the user from the computing system based on the detected facial feature regions, the estimated head pose of the user, and the estimated orientation of the camera. In addition, the computer-executable instructions further cause the processor to compute the desired eye gaze direction of the user using the detected eye region, the estimated head pose of the user, and the estimated orientation of the camera.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computing system, comprising:
    a camera for capturing a video stream comprising images of a user of the computing system; and
    a processor for executing computer-executable instructions that cause the processor to:
        receive the images of the user from the camera;
        detect a face region of the user within the images;
        detect facial feature regions of the user within the images based on the detected face regions;
        determine whether the images represent a complete disengagement of the user from the computing system based on the detected facial feature regions;
        if the images do not represent the complete disengagement of the user from the computing system, detect an eye region of the user within the images based on the detected facial feature regions;
        analyze the detected eye region to determine whether eye movements of the user represent shifting eye movements associated with reading; and
        if the eye movements of the user represent the shifting eye movements associated with reading, compute a desired eye gaze direction of the user based on the detected eye region;
        generate gaze-adjusted images based on the desired eye gaze direction of the user, wherein the gaze-adjusted images comprise at least one of a saccadic eye movement, a micro-saccadic eye movement, or a vergence eye movement; and
        replace the images within the video stream with the gaze-adjusted images.

2. The computing system of claim 1, wherein the computer-executable instructions further cause the processor to generate the gaze-adjusted images using a trained image generator, wherein the image generator is trained using an image discriminator within a generative adversarial network (GAN).

3. The computing system of claim 1, wherein the computer-executable instructions further cause the processor to determine whether the images represent the complete disengagement of the user from the computing system based on the detected facial feature regions by:
   estimating a head pose of the user based on the detected facial feature regions;
   estimating an orientation of the camera based on the detected facial feature regions; and
   determining whether the images represent the complete disengagement of the user from the computing system based on the detected facial feature regions, the estimated head pose of the user, and the estimated orientation of the camera.

4. The computing system of claim 3, wherein the computer-executable instructions further cause the processor to compute the desired eye gaze direction of the user based on the detected eye region, the estimated head pose of the user, and the estimated orientation of the camera.

5. The computing system of claim 1, wherein the video stream comprises images of multiple users of the computing system, and wherein the computer-executable instructions further cause the processor to generate gaze-adjusted images for a current presenter by:
   detecting the face regions of the multiple users within the images;
   detecting the facial feature regions of the multiple users within the images based on the detected face regions;
   analyzing the detected facial feature regions to determine which one of the multiple users is the current presenter; and
   generating the gaze-adjusted images for the current presenter.

6. The computing system of claim 1, wherein the computer-executable instructions further cause the processor to:
   automatically monitor whether a user-selectable on/off mechanism is moved to an "on" position or an "off" position; and
   prevent the replacement of the images within the video stream with the gaze-adjusted images when the user-selectable on/off mechanism is moved to the "off" position.

7. The computing system of claim 1, wherein the computer-executable instructions further cause the processor to compute the desired eye gaze direction of the user by:
   computing the desired eye gaze direction of the user such that an eye gaze of the user is directed towards the camera; or
   computing the desired eye gaze direction of the user such that the eye gaze of the user is directed towards a focal point of interest that is located on a display device of the computing system.

8. The computing system of claim 1, wherein the computer-executable instructions further cause the processor to generate the gaze-adjusted images based on the desired eye gaze direction of the user by:
   analyzing the images to determine at least one of a saccadic eye movement, a micro-saccadic eye movement, or a vergence eye movement of the user within the images;
   comparing an eye gaze of the user within the images with the desired eye gaze direction of the user; and
   adjusting the at least one of the saccadic eye movement, the micro-saccadic eye movement, or the vergence eye movement of the user within the images to produce the gaze-adjusted images.

9. A method for adjusting an eye gaze of a user within a video stream, comprising:
   capturing, via a camera of a computing system, a video stream comprising images of a user of the computing system;
   detecting, via a processor of the computing system, a face region of the user within the images;
   detecting facial feature regions of the user within the images based on the detected face region;
   determining whether the images represent a complete disengagement of the user from the computing system based on the detected facial feature regions;
   if the images do not represent the complete disengagement of the user from the computing system, detecting an eye region of the user within the images based on the detected facial feature regions;
   analyzing the detected eye region to determine whether eye movements of the user represent shifting eye movements associated with reading; and
   if the eye movements of the user represent the shifting eye movements associated with reading, computing a desired eye gaze direction of the user based on the detected eye region;
   generating gaze-adjusted images based on the desired eye gaze direction of the user, wherein the gaze-adjusted images comprise at least one of a saccadic eye movement, a micro-saccadic eye movement, or a vergence eye movement; and
   replacing the images within the video stream with the gaze-adjusted images.

10. The method of claim 9, wherein determining whether the images represent the complete disengagement of the user from the computing system based on the detected facial feature regions comprises:
   estimating a head pose of the user based on the detected facial feature regions;
   estimating an orientation of the camera based on the detected facial feature regions; and
   determining whether the images represent the complete disengagement of the user from the computing system based on the detected facial feature regions, the estimated head pose of the user, and the estimated orientation of the camera.

11. The method of claim 10, wherein computing the desired eye gaze direction of the user based on the detected eye region comprises using the detected eye region, the estimated head pose of the user, and the estimated orientation of the camera to compute the desired eye gaze direction of the user.

12. The method of claim 9, comprising:
   generating the gaze-adjusted images using a trained image generator; and
   training the image generator prior to executing the method of claim 9, wherein training the image generator comprises:
      inputting a plurality of target images and a plurality of gaze-adjusted images generated by the image generator into an image discriminator;
      comparing the plurality of target images and the plurality of gaze-adjusted images using the image discriminator;

assigning an authenticity value of real or fake to each of the plurality of gaze-adjusted images; and updating the image generator in response to assigning the authenticity value of fake to any of the plurality of gaze-adjusted images.

13. The method of claim 9, wherein the video stream comprises images of multiple users of the computing system, and wherein the method is executed for a current presenter by:

detecting the face regions of each of the multiple users within the images;

detecting the facial feature regions of each of the multiple users within the images based on the detected face regions;

analyzing the detected facial feature regions to determine which one of the multiple users is the current presenter; and executing a remainder of the method to generate gaze-adjusted images for the current presenter.

14. The method of claim 9, further comprising:

analyzing the generated gaze-adjusted images to assign a confidence value to the gaze-adjusted images;

if the confidence value is above a specified threshold value, replacing the images within the video stream with the gaze-adjusted images; and if the confidence value is below the specified threshold value, preventing the replacement of the images within the video stream with the gaze-adjusted images.

15. The method of claim 9, wherein computing the desired eye gaze direction of the user comprises:

computing the desired eye gaze direction of the user such that an eye gaze of the user is directed towards the camera; or computing the desired eye gaze direction of the user such that the eye gaze of the user is directed towards a focal point of interest that is located on a display device of the computing system.

16. The method of claim 9, wherein generating the gaze-adjusted images based on the desired eye gaze direction of the user comprises:

analyzing the images to determine at least one of a saccadic eye movement, a micro-saccadic eye movement, or a vergence eye movement of the user within the images;

comparing an eye gaze of the user within the images with the desired eye gaze direction of the user; and adjusting the at least one of the saccadic eye movement, the micro-saccadic eye movement, or the vergence eye movement of the user within the images to produce the gaze-adjusted images.

17. A computer-readable storage medium, comprising computer-executable instructions that, when executed by a processor of a computing system, cause the processor to:

receive a video stream comprising images of a user;

detect a face region of the user within the images;

detect facial feature regions of the user within the images based on the detected face region;

determine whether the images represent a complete disengagement of the user from the computing system based on the detected facial feature regions;

if the images do not represent the complete disengagement of the user from the computing system, detect an eye region of the user within the images based on the detected facial feature regions;

analyze the detected eye region to determine whether eye movements of the user represent shifting eye movements associated with reading; and if the eye movements of the user represent the shifting eye movements associated with reading, compute a desired eye gaze direction of the user based on the detected eye region;

generate gaze-adjusted images based on the desired eye gaze direction of the user, wherein the gaze-adjusted images comprise at least one of a saccadic eye movement, a micro-saccadic eye movement, or a vergence eye movement; and replace the images within the video stream with the gaze-adjusted images.

18. The computer-readable storage medium of claim 17, wherein the computer-executable instructions further cause the processor to generate the gaze-adjusted images using a trained image generator, wherein the image generator is trained using an image discriminator within a generative adversarial network (GAN).

19. The computer-readable storage medium of claim 17, wherein the computer-executable instructions further cause the processor to:

determine whether the images represent the complete disengagement of the user from the computing system based on the detected facial feature regions by:

estimating a head pose of the user based on the detected facial feature regions;

estimating an orientation of the camera based on the detected facial feature regions; and determining whether the images represent the complete disengagement of the user from the computing system based on the detected facial feature regions, the estimated head pose of the user, and the estimated orientation of the camera; and compute the desired eye gaze direction of the user using the detected eye region, the estimated head pose of the user, and the estimated orientation of the camera.

\* \* \* \* \*